United States Patent Office 3,404,703
Patented Oct. 8, 1968

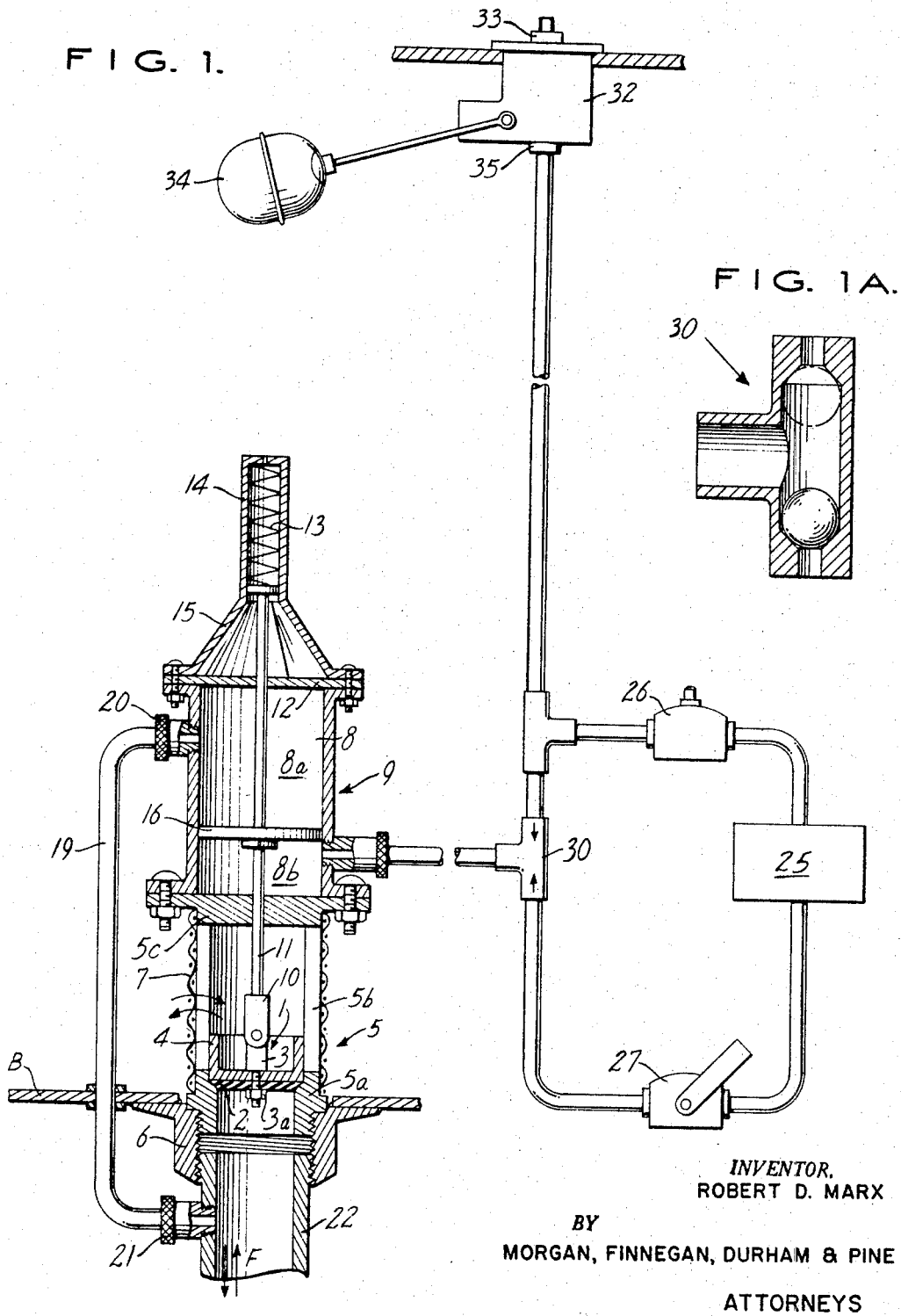

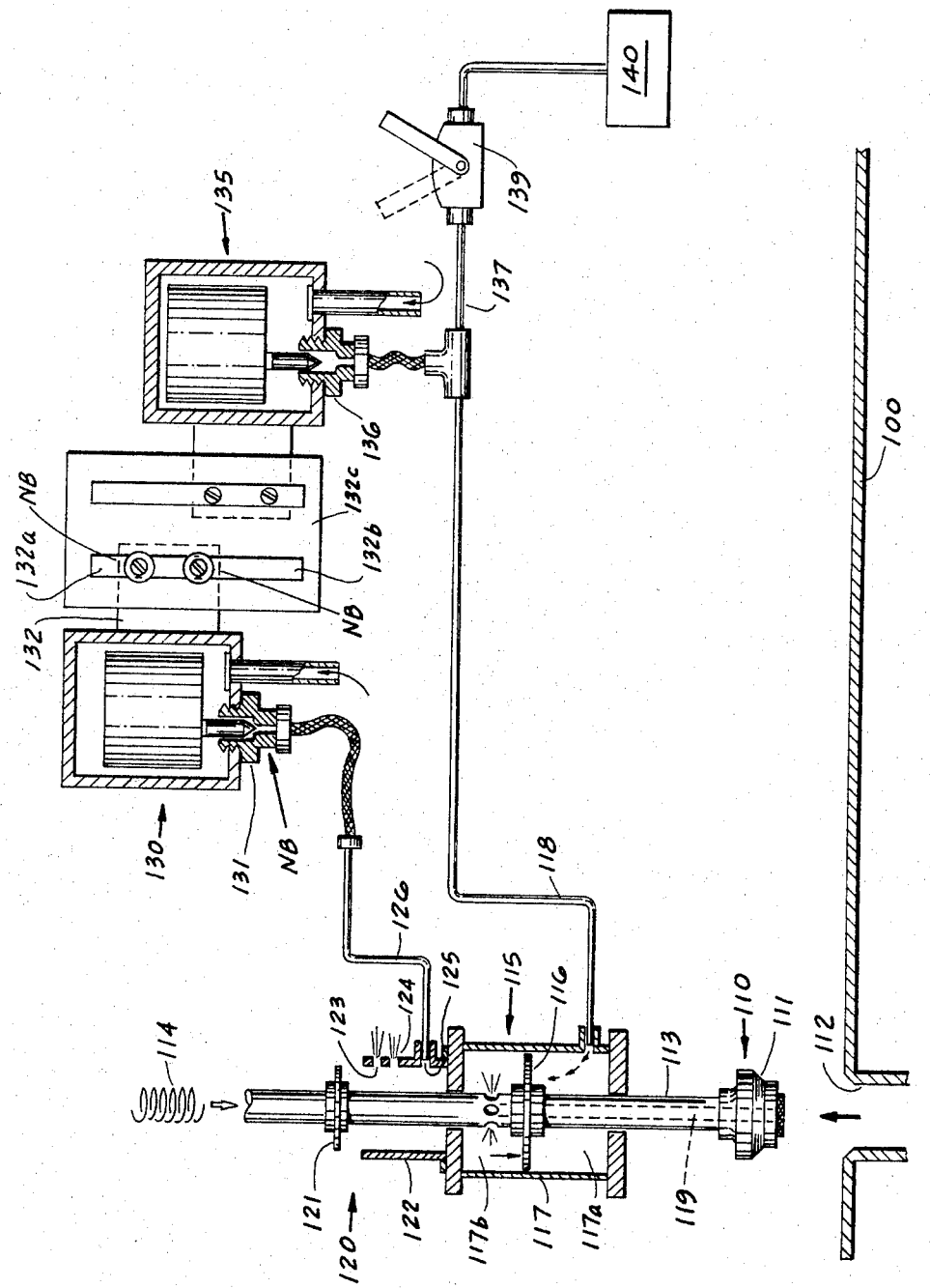

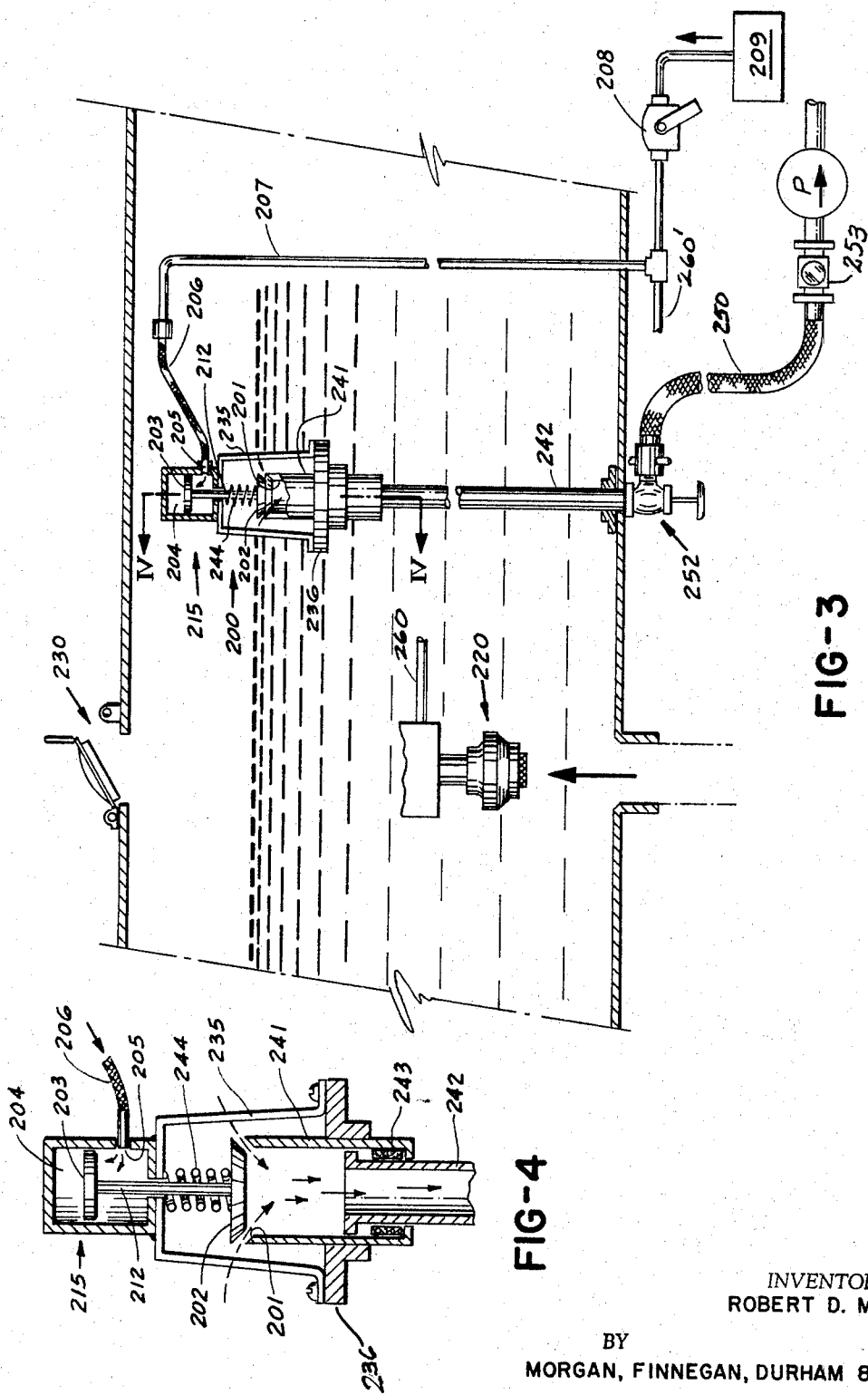

3,404,703
BOTTOM LOADING CONTROL SYSTEM WITH TRANSIENT CLOSING AND LIQUID LEVEL CONTROLS
Robert D. Marx, Valley Stream, N.Y.
(952 Meeker Ave., Brooklyn, N.Y. 11222)
Continuation-in-part of application Ser. No. 117,675, June 16, 1961. This application July 2, 1964, Ser. No. 379,959
22 Claims. (Cl. 137—390)

This invention relates to systems for the bottom loading of fluid storage vessels and, more particularly, to systems for the bottom loading of tanks such as truck tanks which transport liquid products. The systems may also provide bottom unloading but for convenience will be referred to as "bottom loading systems."

This application is a continuation-in-part of applicant's prior copending application Ser. No. 117,675, filed June 16, 1961, now abandoned for Tank Bottom Transfer System.

It is known to employ bottom loading arrangements for truck tanks. One known arrangement, sometimes referred to as a pressure bleed design, comprises a loading valve at the base of the tank which is biased by a spring into the closed position. The valve is housed within a cylinder. When a fluid source is connected to the valve outlet, the pressure thereof is in the direction which is against the face of the loading valve. This fluid ram pressure also communicates through suitable passageways with the cylinder and would be directed against the rear of the loading valve tending to prevent its opening, were it not for a bleed line which relieves this back pressure and allows the forward pressure to predominate. The valve is accordingly forced open against the closing spring and the tank commences to fill.

When the tank is filled, a float-actuated valve in the cylinder bleed line closes. Thus, both front and back faces of the balanced loading valve are subject to pressure from the fluid source. In this event, the differential force provided by the spring urges the valve closed.

Bottom loading systems have many advantages. Gantries, superstructures and swivel booms are not needed. Only a single operator is required and he may stay safely on the ground. Being essentially a closed, automatic system, the bottom loading technique avoids problems of contamination, pilfering and fume leakage and does not depend on operator accuracy for a correct fill.

However, presently employed bottom loading systems have a number of significant disadvantages. Substantial pressurization of the fluid is required to force the bottom valve open. In the course of forcing the valve open, the pressurized fluid undergoes excessive spray and turbulence and if spring pressure is inadequate, the valve will only partially open. Static electric charges can build up to dangerous levels, evaporation through the vents is aggravated and, unless carefully designed, the system may become unstable and oscillate as the turbulent fluid induces oscillation of the float valve. Loading rates may be reduced in forcing the valve open against the spring. Furthermore, float buoyancy is relied on to close the bleed line against input pump pressure. Therefore, the time at which the float valve closes will vary depending on the particular value of pumping pressure. Since the time of closing is variable due to changes in this pressure, then the liquid level will vary accordingly from its original calibrated level which is set at some fixed pumping pressure. A limitation is thus placed on fill accuracy. In the event of bleed line rupture or float valve malfunction, the loading valve will not close and tank rupture or overload spillage may occur. Many of the known systems also require an additional compartment valve for unloading.

In addition to the foregoing, many known and proposed systems are characterized by excessive pressure surges and shocks particularly during valve closing operations. Many of the systems have inherent accuracy limitations due to a lack of precise control over the movement of the loading/unloading valve. Accuracy limitations are also developed due to inadequacies in the sensing and control means heretofore employed.

Additional limitations characterizing known and proposed systems relate to susceptibility to operator error and inadequate provisions for emergency shutdown.

It is, accordingly, an object of the invention to provide an improved loading system for truck tanks and the like.

An additional object of the invention is to provide a bottom loading system for truck tanks and the like having improved loading accuracy and higher loading rates.

A still further object of the invention is to provide such a bottom loading system which has greater immunity from the effects of malfunctions and manual errors in operating procedures.

A still further object of the invention is to provide a bottom loading system for truck tanks and the like which has improved stability of operation.

An additional object of the invention is to provide improved liquid level control means for truck tanks and the like.

A further object of the invention is to significantly reduce pressure surges and shocks in the loading and unloading of truck tanks and a still further object of the invention is to provide more precise control over the movement of the loading valve in such systems.

Other objects of the invention include a bottom loading system which for a given product pressurization, permits maximum flow rate loading, a system having features which facilitate emergency cut-off of the loading operations, a system which eliminates excessive spray, turbulence, static and the like, and one in which the loading valve is also used for unloading operations.

These and other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

Serving as illustrations of exemplary embodiments of the invention are the drawings of which:

FIGURE 1 is an elevational view, partly in section and partly schematic, of a bottom loading system according to the invention;

FIGURE 1A is a detail view of a check valve employed in the system of FIGURE 1;

FIGURE 2 is an elevational view partly in section and partly schematic of another bottom loading system embodiment;

FIGURE 3 is an elevational view partly in section and partly schematic of a return system particularly adapted for use in controlling the liquid level in truck tanks and the like; and FIGURE 4 is an elevational and sectional detailed view of the return valve mechanism of FIGURE 3.

In the embodiment illustrated in FIGURES 1 and 1A, the bottom loading system comprises a product flow valve 1 including a head seal 2 and a stem 3 formed as the shank of a bolt 3a which also serves to secure seal 2 on the valve head 4. Valve 1 is adapted to control a product port defined by a cage assembly 5 having a lower valve seat section 5a threadably or otherwise connected to a mounting ring 6 which is secured to the base B of a truck tank as by welding. Cage assembly 5 also includes a pluarlity of circumferentially spaced struts 5b around which a screen 7 is mounted. The struts are interconnected at their ends by seat section 5a and at their other ends by cage head 5c. The latter also serves to define the base plate of a cylinder 8 which is a component of a two-way or double-acting actuator generally indicated at 9.

Valve 1 is operatively coupled to actuator 9, illustratively by means including a clevis 10 and a lift rod 11 which is connected to stem 3 via the clevis. Rod 11 passes axially through the cage assembly 5, plate 5c and cylinder 8, its distal end passing through cover plate 12 and engaging resilient means comprising a spring 13 in a tubular housing 14. The latter connects to cover plate 12 via struts 15 which are secured as by bolting to the cover plate and to the wall of cylinder 8. Base plate 5c is also secured to the cylinder wall. Seals, not shown, are provided in plates 5c and 12 where rod 11 passes therethrough.

Fast on rod 11 is piston 16 in the interior of cylinder 8. The piston divides the cylinder into upper and lower chambers 8a and 8b, respectively, and is coupled to valve 1 via the rod 11. Both the piston and the valve are resiliently urged downward by spring 13. As seen in the figure, the effective working area of the piston is larger than that of the product flow valve. For example, the piston diameter may be 5 inches and the valve orifice diameter 4⅛ inches.

The upper face of piston 16 is responsive to the fluid pressurization of cylinder 8 derived from product pressure provided during the loading operation. Thus, the upper chamber 8a is connected to one end of a line 19 via a fitting 20 while the other end of the line is connected via a fitting 21 to a coupling 22 threaded or otherwise connected to mounting ring 6. The upper chamber 8a and upper face of piston 16 (which includes a piston-cylinder seal, not shown) will thus be responsive to pressure conditions in the product port controlled by valve 1. Coupling 22 is adapted for connection to a hose or other conduit which receives the tank product during bottom loading and discharges the same during unloading as symbolized by the arrows F.

Lower chamber 8b and the lower face of piston 16 are pressurized from a controlled fluid pressure system. As embodied, this pressure system includes a source of fluid pressure, e.g., the truck pneumatic supply 25, a loading valve 26 and a discharge valve 27 (which may be combined with 26), each of which is connected to source 25 and to a check valve 30. The fluid pressure system also includes liquid-level responsive means, illustratively a normally closed float valve 32 having an exhaust orifice 33, float 34, and inlet connector 35. Inlet 35 is connected to loading valve 26 and check valve 30.

The pressure system will generally also include additional remote control valves, fusible pressure-relief means, interlock valves and the like in accordance with specific installation requirements and controlling ordinances and regulations.

Typical operation of the system is as follows:

For bottom loading, valve 26 which is a normally closed spring-return, two-way valve is momentarily opened. During this interval, pneumatic pressure is transmitted from source 25 to chamber 8b of actuator 9 via check valve 30. With no product, or less than full capacity in the tank, float valve 32 is closed. The application of pressure to chamber 8b causes an upward displacement of piston 16, which displacement is transmitted via rod 11 to valve 1 causing the latter to open against the action of spring 13. As valve 1 is opened, the product commences to enter and fill the tank, passing between struts 5b and through screen 7. It may be noted here that since valve 1 is opened independently of product pumping pressure, excessive turbulence, spray, vapor loss and static, such as occurs in many known arrangements, are eliminated. Moreover, large pumping pressures are not required as in the case where such pressures are required to force the valve open against the spring. The inlet port may be of large diameter thereby facilitating the rapid loading of the product.

When the product reaches a prescribed level, float 34 is fully displaced thereby opening float valve 32 and diverting pressure from chamber 8b and the lower face of piston 16. With pressure so diverted, valve 1 commences to close with the aid of spring 13. As the closed position approaches, there acts increasingly on the face of valve 1 the effective pressure of the entering product tending to maintain valve 1 in its open position. But, also acting on the valve is the piston 16, the upper face of which is pressurized via chamber 8a in accordance with the product-developed pressure. Since piston 9 has an effective area larger than the area of valve 1, then the force of piston 16 predominates and valve 1 accordingly closes. This action is relatively smooth, precise and automatic, and the closing rate varies in accordance with the product flow rate thus maintaining system calibration notwithstanding variation in the flow rate.

In the event of certain malfunctions during the loading operation, for example, a failure in the pressure system, a loss of pressure from source 25 or a break in the float valve lines, pressure will be diverted from chamber 8b and valve 1 will close as described above. Moreover, for emergency cutoff it is only necessary to relieve the pressure at chamber 8b by any suitable means whereby valve 1 quickly closes. It may also be observed that a bleed line is not necessary; line 19 can be as large as required, thus facilitating rapid control responses and a more accurate fill.

For unloading operations, valve 27 (three-way) is opened causing the application of pressure to chamber 8b. This occurs though float valve 32 is opened because the latter is isolated by the action of check valve 30 which closes the line to inlet 35 and diverts the pressure to chamber 8b. Valve 1 accordingly opens as described hereinbefore. The tank product then passes out of the tank and into the receptacles, e.g., airplane tanks, for receiving the product. When the tank compartment has been emptied, valve 27 is closed, thus removing pressure from, and venting chamber 8b whereby valve 1 closes under the action of spring 13.

It may be seen from the above that the system of FIGURE 1 provides safe, automatic, rapid and accurate product transfer with respect to truck tanks and the like.

The system of FIGURE 2 is also intended for use in connection with the loading and unloading of the compartments of a truck tank such as a refueler 100 which carries aircraft fuel. As shown, the system includes a compartment valve 110 preferably having a composition seat 111 adapted to seal the port 112, into and out of which the tank product passes.

Valve 110 is coupled, illustratively by direct connection of its stem 113, to a pneumatic overbalanced actuator 115 conveniently provided with a piston 116 secured on stem 113 and located within a cylinder 117 so as to divide the cylinder into two compartments 117a, 117b. Chamber 117a communicates with a control line 118 for purposes described hereinafter while chamber 117b is in communication with the face of valve 110 via a bore 119 in stem 113. A spring 114 also acts on stem 113, urging valve 110 towards its closed position.

Valve 10 is also coupled to controllable retard means embodied as a dashpot 120 having a piston 121 conveniently connected to piston stem 113. The dash pot cylinder 122 is mounted on the head of actuator 115 and includes axially displaced orifices 123, 124 and a further outlet 125 which communicates with a control line 126 for purposes described hereinafter.

The system of FIGURE 2 includes a final liquid-level senser and associated valve embodied as a float 130 which in the nonbuoyant position maintains a normally closed needle valve 131 in the closed position. Valve 131 communicates via line 126 with the outlet 125 of dashpot 120. Float 130 is positioned to actuate (open) valve 131 when the tank product reaches the final desired level.

An adjustment flange 132 is provided on float 130 and has locking screws 132a disposed in a slot 132b on a bracket 132c of tank 100 so that the position of float 130 may be adjusted for adjustment of the final product level.

The system of FIGURE 2 also includes valve control means embodied as a prelevel senser and associated control valve comprising a prelevel float 135 which may be adjusted in the same manner as float assembly 130 and which is adapted when buoyant to open a needle valve 136 to thereby vent the line 118 communicating with chamber 117a of actuator 115. Line 118 and chamber 117a are, in the closed position of valve 136, charged by operation of a valve 139 which supplies pneumatic pressure thereto. Valve 139 is a valve having a spring-returned neutral, closed, position such that release of the valve control after operation causes it to return to this neutral position to thus maintain line 118 and chamber 117a in a charged condition provided there are no leaks. Operation of the valve 139 to its third position vents the charged system thus providing means for rapid deactivation and closure of valve 110 should an emergency occur during loading or unloading.

For loading the compartment 100, a supply hose, not shown, for delivering the product under pressure is connected to inlet 112. As in the embodiment of FIGURES 1 and 1A, the product under pressure is not employed to force valve 110 open and hence the usual shortcomings of such conventional systems, including excessive spray, turbulence, static charges and the like, are thus avoided. Pump pressure cannot force the valve 110 open because the pump force generated by way of bore 119 and the upper face of piston 116 in actuator 115 is greater than the pump force acting directly against the face of valve 110. Rather, valve 110 is opened independently of pump pressure by way of the actuator 115, control line 118, valve 139 and the source of pneumatic pressure which in a preferred form comprises the chassis brake air system 140.

Momentary actuation of valve 139 applies pneumatic pressure to chamber 117a. Valve 110 responds by opening. Valve 139 may then be released and, provided there are no leaks, valve 110 remains opened. Product commences to enter the compartment via port 112. Illustrative flow rates are in the range 200 g.p.m. to 1000 g.p.m. When the liquid level reaches the prelevel point, float valve 135 releases the needle of valve 136 and thus vents the lines 118, 137 and chamber 117a.

Under the action of spring 114 which acts on stem 113, valve 110 commences to close. In the course of closing, piston 121 of dashpot 120 enters cylinder 122 thereof to thus provide a retardation action associated with the restricted outflow of product from orifices 123 and 124 of the dashpot. A second and further retardation occurs when piston 121 of dashpot 120 passes orifice 123.

Finally, upon reaching and sealing orifice 124 the closing action initiated by spring 114 is terminated since outlet 125 and line 126 communicating therewith are closed. The system dimensions are designed such that this temporary termination of the closing action leaves valve 110 partially open. Hence the product continues to enter the system at a reduced rate, e.g., 25 g.p.m.

When the final product level is reached, float 130 opens valve 131 to thereby open orifice 125 of the dashpot. Hence, valve 110 commences again to close under the action of spring 114 and also under the action of the overbalanced actuator whose effectiveness increases as valve 110 approaches the closed position. At this latter stage, pump pressure acting through bore 119 and chamber 117b positively urges valve 110 into its fully closed position. In this closing action, system adjustments and dimensions are such as to prevent closing shock and closing surges.

It will be noted that the precise control over the action of valve 110 during its closing stages not only reduces undesirable shock and surges but also produces a more accurate fill. Closing shock pressure surges as low as 15% at 1000 g.p.m., 10% at 500 g.p.m. and 3% at 250 g.p.m. are readily realizable. Back pressure is similarly reduced.

Since the flow into the compartment is closely controlled by reducing the valve opening and maintaining it in the interval between the prelevel and final level then accurate filling to a precise predetermined level is more readily achieved even in the presence of varying pumping pressures.

A liquid level control and liquid/vapor return system which is adapted for use in truck tank systems including those of FIGURES 1 and 2, is shown in FIGURES 3 and 4. The system includes a return system 200 having an inlet 201 effectively at the desired liquid level.

Inlet 201 is controlled by valve 202 and an actuator 215, the latter comprising (FIG. 4), piston 203 and cylinder 204, the cylinder being charged via cylinder inlet 205, lines 206, 207 and valve control 208 from a source of pneumatic pressure 209 which may comprise the chassis air brake supply.

Piston 203 is connected to valve head 202 via stem 212. Cylinder 204 is conveniently mounted on brackets 235 upstanding from a flange member 236 which is secured to inlet pipe section 241; the upper end of 241 defines the inlet 201 and section 241 is in adjustable relationship and communicates with the lower section 242 of the return system. Illustratively, this is effected by assembling sections 241 and 242 in telescoping relationships and providing appropriate sealing such as packing 243. Liquid level may be controlled by appropriate positioning of section 241.

The outlet end of section 242 connects to the tank exterior and to a return hose 250 through a shutoff valve 252. Return 250 may include a sight glass 253, or a flow meter or the like for indicating flow through 250.

The illustrated return system preferably has a capacity equal to inlet flow through the loading valve. The latter may comprise a bottom loading valve 220 such as hereinbefore described, or top loading inlet 230. During loading operations, the control valve 208, which may be interlocked with or a part of the loading valve control system via connection 260, 260′, is actuated whereby valve 202 opens to thus open inlet 201.

During loading, vapors are returned through 241 and 242; excessive product is similarly returned when the level defined by inlet 201 is attained. Automatic or manual monitoring of flow in the line 250 marks this latter condition and automatic or manual cut off of the loading operation is then effected. It may be seen that effective return action together with accurate level control are achieved.

With loading concluded, valve 208 is manually operated, or automatically controlled in response to flow in the return system, to deenergize actuator 215. A spring 244 on stem 212 then causes valve 202 to close inlet 201 to keep product from surging into the return system, e.g., such as would occur during vehicle starting and stopping.

The invention in its broader aspects is not limited to the specific mechanisms shown and described but departures may be made therefrom within the scope of the accompanying claims without departing from the principles of the invention and without sacrificing its chief advantages.

What is claimed is:

1. A system for the bottom loading of a fluid product in a truck tank and the like comprising a normally closed bottom valve in said tank having a port for the admission of said product into said tank, a double-acting fluid controlled actuator, longitudinally inextensible means coupling said actuator to said valve in fixed space relation for controlling valve operation, fluid pressure means controllable independently of product input pressure coupled to a first input of said actuator for opening said valve and fluid pressure transmitting means responsive to product pressure in said port and coupled to a second input of said actuator to facilitate valve closure movement against opposing product input pressure.

2. A system as set forth in claim 1 in which said controllable fluid pressure means includes product level responsive means for controlling the pressurization of said first input of said actuator.

3. A system as set forth in claim 1 in which the working pressure area of said actuator at said second input is larger than the effective pressure area of said valve to provide a positive valve closing force in the presence of product input pressure.

4. A system as set forth in claim 1 in which said controllable fluid pressure means comprises a pneumatic pressure source manually operated, valving means and product level responsive valving means interconnected with said pressure source for controlling the pressurization of said actuator.

5. A system as set forth in claim 1 including retard means responsive to bottom valve position for controlling the closure rate of said valve.

6. A system as set forth in claim 5 including product-level responsibe means coupled to said valve closure retard means for controlling the retarding action of said retard means.

7. A system for the bottom loading and discharge of a fluid product carried in a truck tank or the like comprising a bottom valve in said tank having a longitudinally inextensible stem and a port for said loading and discharge, a double acting fluid controlled actuator connected in fixed space relation to said valve by said stem for controlling movement of said valve, resilient means coupled to said valve for urging closure thereof, means for selectively applying pressure to a first input of said actuator for opening said valve and a fluid connection between said port and a second input of said actuator for coupling product loading pressure to said actuator to facilitate closure of said valve.

8. A system as set forth in claim 7 in which said actuator comprises a cylinder and piston within said cylinder, said piston being mounted on said valve stem for movement therewith relative to said cylinder and dividing said cylinder into two opposing pressure chambers, one chamber being pressurized via said first input and the other chamber being pressurized via said second input.

9. A system as set forth in claim 8 in which said piston has an effective working area in said second input pressure chamber larger than the effective frontal area of said valve whereby said valve may be closed regardless of the opposing product pressure thereagainst.

10. A system as set forth in claim 7 in which said means for selectively applying pressure includes product level responsive pressure relief means connected to said first input for initiating bottom valve closure when the liquid in said tank reaches a preselected level.

11. A system as set forth in claim 7 including retard means connected to said valve for regulating the closure rate thereof as a function of valve position and product level.

12. A system as set forth in claim 7 in which said means for selectively applying pressure includes pneumatic loading means having momentarily actuated valve means for providing said actuator with locked pressure whereby a failure in said pressure means deenergizes said actuator causing said bottom valve to close.

13. A system as set forth in claim 7 including first product level responsive pressure relief means operatively coupled to said first input of said actuator for initiating bottom valve closure at a first preselected liquid level, retard means coupled to said bottom valve independently of said first pressure relief means for regulating closure thereof as a function of valve position and second product level responsive pressure relief mean controlling said closure retard means for effecting final closure of said bottom valve at a second preselected liquid level.

14. A system for the bottom loading of a fluid product in a truck tank and the like comprising a bottom valve in said tank for the controlled admission of said product into said tank, and hydraulic transient valve control means for controlling the closing action of said valve independently of external pressurization including means for holding said valve partially closed for a terminal period of the loading operation to reduce input flow rate as liquid approaches the desired level whereby accurate level control is attained.

15. The system defined in claim 14 in which said transient control means comprises a dashpot having a controlled orifice and a float valve controlling said orifice.

16. The system defined in claim 14 in which said transient control means is adapted to gradually reduce the closure rate of said bottom valve following initial closure movement to thereby reduce shock and surges.

17. The system defined in claim 16 in which said transient control means comprises viscous damper means having a movable member connected directly to said valve.

18. The system defined in claim 16 in which said transient control means include means controlled according to product level for temporarily holding said valve partially closed to facilitate accurate level control.

19. A system for the bottom loading of a fluid product in a truck tank and the like comprising a bottom valve in said tank, a fluid-operated piston actuator, connected directly to said bottom valve in fixed space relation therewith and actuator control means including a source of pressure, control valve means and product-level responsive pressure relief means whereby said actuator may be pressurized from said source by said control valve means to open said bottom valve for product transfer with said actuator being depressurized by said pressure relief means when said product reaches a particular level.

20. The system as defined in claim 19 in which said control valve means is operative to lock said actuator in a pressurized condition whereby pressure system failure will cause bottom valve closure.

21. The system as defined in claim 19 including valve closure control means connected to said valve for temporarily stopping closure thereof and further product level responsive pressure relief means operatively coupled to said closure control means for terminating said stopping action when a desired liquid level is attained.

22. The system as defined in claim 21 in which said closure control means comprises a dash pot and said dash pot includes orifices for reducing closure rate to limit surges.

References Cited

UNITED STATES PATENTS

| | | | |
|---|---|---|---|
| 2,707,378 | 5/1955 | Ryan | 251—62 X |
| 2,849,019 | 8/1958 | Oliveau et al. | 137—391 |
| 3,029,833 | 4/1962 | De Frees | 137—414 |
| 3,251,375 | 5/1966 | Reed et al. | 137—414 |

WILLIAM F. O'DEA, *Primary Examiner.*

DAVID R. MATTHEWS, *Assistant Examiner.*